United States Patent [19]

Mizuno et al.

[11] Patent Number: 5,683,628
[45] Date of Patent: Nov. 4, 1997

[54] PHOTOCHROMIC COMPOSITION AND PHOTOCHROMIC RESIN OBTAINABLE BY USING THE SAME

[75] Inventors: Hitoshi Mizuno; Satoshi Kubota; Tooru Saito; Toshiyuki Miyabayashi, all of Suwa; Takashi Kobayakawa, Tsukuba, all of Japan

[73] Assignees: Seiko Epson Corp., Tokyo-To; Tokuyama Corp., Yamaguchi-Ken, both of Japan

[21] Appl. No.: 542,530

[22] Filed: Oct. 13, 1995

[30] Foreign Application Priority Data

Oct. 17, 1994 [JP] Japan .................................. 6-250685

[51] Int. Cl.$^6$ .................................................. G02B 5/23
[52] U.S. Cl. .......................................................... 252/586
[58] Field of Search .................................. 252/582, 586

[56] References Cited

U.S. PATENT DOCUMENTS

| | | | |
|---|---|---|---|
| 5,247,041 | 9/1993 | Iguchi | 526/289 |
| 5,330,686 | 7/1994 | Smith et al. | 252/586 |
| 5,462,698 | 10/1995 | Kobayakawa et al. | 252/586 |
| 5,520,853 | 5/1996 | Rickwood et al. | 252/586 |

FOREIGN PATENT DOCUMENTS

| | | |
|---|---|---|
| 0559939 | 9/1993 | European Pat. Off. . |
| 0619358 | 10/1994 | European Pat. Off. . |
| 4325154 | 9/1994 | Germany . |
| 59049278A | 3/1984 | Japan . |

OTHER PUBLICATIONS

Database WPI, Section CH, Week 8418 Derwent Publication Ltd. London, G.B. Class A89, AN 84-110057, 1984.

*Primary Examiner*—Philip Tucker
*Attorney, Agent, or Firm*—Ladas & Parry

[57] ABSTRACT

A photochromic composition comprising (a) 100 parts by weight of a di(meth)acrylate compound represented by the formula (I):

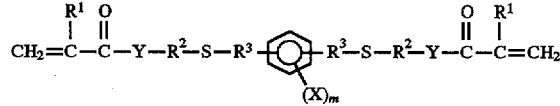

wherein $R^1$s each independently represent hydrogen or methyl, $R^2$s and $R^3$s each independently represent alkylene having 1 to 4 carbon atoms, X represents halogen other than fluorine, Y represents oxygen or sulfur, and m is an integer of 0 to 4, and (b) 0.01 to 5 parts by weight of a photochromic compound. The photochromic composition is excellent in heat resistance, mechanical strength, adhesion to a hard coat layer and moldability, and the photochromic properties thereof is highly resistant to light. By the use of the photochromic composition, a thin and light-weight photochromic lens or the like can be obtained.

20 Claims, No Drawings

PHOTOCHROMIC COMPOSITION AND PHOTOCHROMIC RESIN OBTAINABLE BY USING THE SAME

BACKGROUND OF THE INVENTION

1. Field of the Invention

The present invention relates to a photochromic composition and a photochromic resin obtainable from the same.

2. Background Art

A variety of studies have been made on photochromism, and photochromic materials are used for various purposes such as recording materials and optical lenses. In particular, lenses for spectacles having photochromic properties have great popularity as lenses having a high added value because they are colorless or light-colored inside a room, but undergo a color change on irradiation by the sunlight. Thus, the spectacles can function as sunglasses. Photochromic lenses of the early stages contain silver halide and change to a quiet color such as gray or brown. However, lenses made of glass are heavy and readily broken, so that plastic lenses are now mainly used in compliance with the demand for safety and light-weight lenses. Further, in the case of glass-made photochromic lenses, color change is caused even at the inner part thereof. This nature makes a difference in apparent color density between those parts of the lens which are different in thickness; lenses with such a difference are unnatural to look at.

A photochromic plastic lens is prepared by mixing a photochromic compound into a resin suitable for lenses, and subjecting the mixture to molding. Various photochromic compounds to be incorporated into a resin have been proposed. For instance, Japanese Patent Laid-Open Publication No. 161286/1986 discloses a spirooxazine compound, and Japanese Patent Publication No. 43315/1991 discloses a photo-reversibly changeable composition containing a spirooxazine photo-reversibly changeable composition and a hindered amine light stabilizer.

Further, as an example of such a photochromic composition that is obtained by mixing a photochromic compound into a resin, Japanese Patent Laid-Open Publication No. 121188/1991 discloses a photochromic composition which comprises chromene or a derivative thereof, a fulgide compound or a fulgimide compound and an ultraviolet stabilizer, and which changes to a color such as gray, amber or brown. Furthermore, Japanese Patent Laid-Open Publication No. 233079/1986 discloses a specific spirooxazine compound, and a resin obtained by dissolving this compound in methyl methacrylate, and subjecting the mixture to cast polymerization is illustrated in this Publication.

Unlike glass-made photochromic lenses, plastic ones scarcely have a difference in the density of a color, which is made due to the difference in the thickness thereof. However, since a photochromic compound is incorporated into a resin, it has been pointed out that the photochromic compound readily undergoes deterioration by the action of those radical species which are generated in the course of polymerization to produce the resin, or by the action of the polymer matrix itself. Thus, the initial color change properties of the photochromic plastic lenses tend to be drastically lowered, or the color change properties tend to undergo deterioration by repeated use or long-term use of the lenses.

For this reason, monomer species which can be used for the production of photochromic resins are limited. Therefore, it is hardly avoidable that the physical properties such as specific gravity, mechanical strength and refraction index other than the photochromic properties are sacrificed. In particular, many of the photochromic compounds which are changeable to a quiet color such as gray or brown are not durable. Therefore, it has been difficult to obtain photochromic resins which can be put into practical use by using such photochromic compounds. For example, it has been known that a photochromic lens having excellent light resistance cannot be obtained by the combination use of allyl diglycol carbonate, which is widely used for producing lenses for spectacles, and a photochromic compound of the above type.

For the above background, these known arts merely disclose, as resins which can be used along with photochromic resins, ordinary transparent resins such as polymethyl methacrylate which are poor in refraction index and the like.

Presently, thin and light-weight lenses are produced by the use of resins having a high refraction index. Many of the resins having a high refraction index are obtained from monomers containing an aromatic ring. However, the adhesion to a hard coat tends to be lowered in those photochromic lenses which are produced by the use of a resin containing an aromatic ring. When such lenses for spectacles are used under severe conditions, a coating film provided thereon tends to peel off the lenses.

On the other hand, in the case where a urethane or thiourethane resin having a high refraction index is used, it has been observed that an isocyanate monomer, a starting material for the resin, reacts with a photochromic compound, whereby the photochromic compound completely loses its photochromic properties.

Under such circumstances, a need still exists for excellent photochromic resins is still existing.

SUMMARY OF THE INVENTION

We have now found that a photochromic resin excellent in various properties can be obtained by the use of a photochromic composition comprising a specific di(meth)acrylate compound.

Accordingly, an object of the present invention is to provide a photochromic composition capable of providing a photochromic resin which is excellent in various properties.

Another object of the present invention is to provide a photochromic resin which is excellent in various properties.

According to the present invention, there provides a photochromic composition of the present invention which is capable of being a photochromic resin when polymerized and which comprises:

(a) a di(meth)acrylate compound represented by the following formula:

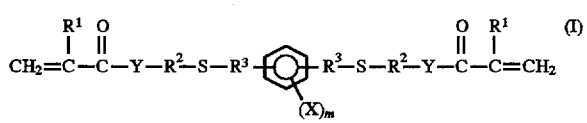

wherein two $R^1$s each independently represent hydrogen or methyl, two $R^2$s and two $R^3$s each independently represent alkylene having 1 to 4 carbon atoms, X represents halogen other than fluorine, two Ys each independently represent oxygen or sulfur, and m is an integer of 0 to 4; and (b) a photochromic compound in such an amount that photochromic properties can be imparted to the photochromic resin.

Further, according to the present invention, there provides a photochromic resin which comprises a polymer of the above photochromic composition of the present invention.

DETAILED DESCRIPTION OF THE INVENTION

Definition

In this disclosure, an alkyl group, or an alkyl group as a part of a certain group may be either of straight chain or of branched chain. Further, a halogen atom means fluorine, chlorine, bromine or iodine, unless otherwise noted. Furthermore, a halogenoalkyl group means an alkyl group in which one or more hydrogen atoms are substituted with a halogen atom.

Photochromic Composition

The photochromic composition according to the present invention comprises a di(meth)acrylate compound (component (a)) represented by the formula (I), and a photochromic compound (component (b)). The composition "comprising" the components (a) and (b) herein includes a composition consisting of the components (a) and (b), and a composition containing the components (a) and (b) and a third component other than the components (a) and (b). Examples of the third component include a monomer other than the component (a), an ultraviolet stabilizer, a polymerization initiator (the details thereof will be described later).

Component (a): Di(meth)acrylate Compound

The di(meth)acrylate compound for use in the present invention is the compound represented by the formula (I) in which acrylic or methacrylic acids are combined with thio-ether chain, and in which the thioether chain has therein a phenylene group which is nuclear-substituted with a halogen atom or non-substituted.

From the monomer represented by the formula (I), there can be obtained a photochromic resin which is excellent in heat resistance, mechanical strength, impact resistance, low water absorption, adhesion to a hard coat, moldability and the like. Further, the photochromic resin according to the present invention has excellent photochromic properties, and is characterized in that the photochromic properties last for a long period of time. Furthermore, the photochromic composition according to the present invention is advantageous in that it can provide a photochromic resin having a high refraction index, from which light-weight, thin lenses can be obtained.

In particular, the photochromic composition and resin according to the present invention have not only excellent photochromic properties which are required essentially but also excellent moldability and high adhesion to a hard coat, and, at the same time, can have a high refraction index. These advantages are unexpected ones in view of the conventional knowledge that only poor adhesion of a hard coat on a photochromic lens can be obtained when a resin containing an aromatic ring is used in order to enhance the refraction index thereof.

In the formula (I), two $R^1$s are independently, that is, they may be the same or different, represent hydrogen atom or methyl group. Therefore, in the present invention, the term "di(meth)acrylate compound" is used to collectively indicate a compound in which both of two $R^1$s represent methyl group, dimethacrylate compound, a compound in which both of two $R^1$s represent hydrogen atom, diacrylate compound, and, in addition to these compounds, a compound in which one of two $R^1$s represents methyl group and the other one represents hydrogen atom.

In the di(meth)acrylate compound represented by the formula (I), the thioether chain can be attached to the phenylene group at any of the o-, m- and p-positions. However, the m- or p-position is typical and preferred. Further, it is preferable that $R^2$s and $R^3$s be an alkylene group having 1 to 3 carbon atoms. Ethylene and propylene are particularly preferable as $R^2$, and methylene and ethylene are particularly preferable as $R^3$. X is chlorine, bromine or iodine atom. Preferable X is bromine. The number of X, i.e., m is from 0 to 4, preferably from 0 to 2.

Specific examples of the di(meth)acrylate compound represented by the formula (I), suitably used in the present invention include the following compounds:

p-bis(2-methacryloyloxyethylthio)xylylene, p-bis(3-methacryloyloxypropylthio)xylylene, p-bis(2-methacryloyloxyethylthioethyl)phenylene, and p-bis(3-methacryloyloxypropylthioethyl)phenylene.

In the present invention, these di(meth)acrylate compounds can be used either singly or in combination of two or more.

In the photochromic composition according to the present invention, only the di(meth)acrylate compound represented by the formula (I) can be used as the monomer. However, according to the preferred embodiment of the present invention, other polymerizable monomers can also be used along with the di(meth)acrylate compound.

Examples of the monomer to be used along with the compound (I) include a monomer which can be a homopolymer having a high refraction index of 1.55 or more, and a monomer which can be a homopolymer having a medium or low refraction index of less than 1.55. In the present invention, any monomer can be used without any limitation as long as it is not contrary to the purpose of the present invention.

Examples of the monomer which can be a homopolymer having a refraction index of 1.55 or more include mono (meth)acrylate compounds represented by the following general formula (II):

wherein $R^1$ is as defined in the formula (I), and $R^4$ represents phenyl, benzyl or 2-phenoxyethyl group, or phenyl, benzyl or 2-phenoxyethyl group in which one or more hydrogen are substituted with halogen other than fluorine; and di(meth)acrylate compounds represented by the formula (III):

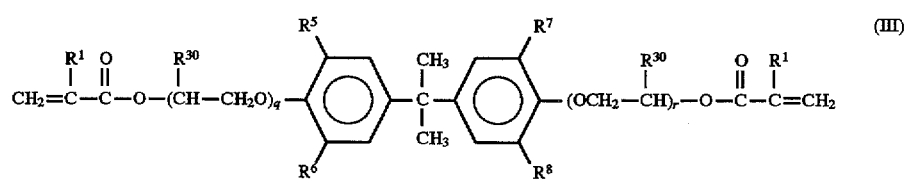

wherein

R¹s are as defined in the formula (I), two R³⁰s each independently represent hydrogen or methyl, R⁵, R⁶, R⁷ and R⁸ each independently represent hydrogen or halogen other than fluorine, and q and r are such integers that the total of q and r is from 0 to 10.

The combination use of the mono(meth)acrylate compound of the formula (II) with the compound of the formula (I) is preferable because it brings about a resin having a high refraction index and improved mechanical strength. Specific examples of the mono(meth)-acrylate compound include phenyl (meth)acrylate, benzyl (meth)acrylate, 2-phenoxyethyl (meth)acrylate, 1,3,5-tribromophenyl (meth)acrylate and 2-(1',3',5'-tribromophenyl)-oxyethyl (meth)acrylate.

Further, the combination use of the di(meth)acrylate compound represented by the formula (III) with the compound of the formula (I) is preferable because it brings about a resin having a high refraction index, improved heat resistance and increased mechanical strength. Specific examples of the di(meth)acrylate compound include 2,2'-bis[4-(methylacryloyloxyethoxy)phenyl]propane, and 2,2'-bis[(3,5-dibromo-4-methacryloyloxyethoxy)phenyl]-propane.

Examples of the monomer which can be a homopolymer having a refraction index of less than 1.55 include mono(meth)acrylate compounds represented by the formula (IV) or (V):

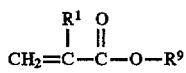  (IV)

wherein

R¹ is as defined in the formula (I), and

R⁹ represents alkyl having 1 to 4 carbon atoms; or

  (V)

wherein

R¹ is as defined in the formula (I), and

R¹⁰ represents alicyclic hydrocarbon having 5 to 16 carbon atoms; and di(meth)acrylate compounds represented by the formula (VI):

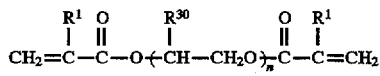  (VI)

wherein

R¹ is as defined in the formula (I),

R³⁰ is as defined in the formula (III), and n is an integer of 1 to 10.

The combination use of the mono(meth)acrylate compound of the formula (IV) with the compound of the formula (I) is advantageous because it brings about a resin having improved photochromic color change properties and enhanced durability in the photochromic properties. Specific examples of the compound (IV) include methyl (meth)acrylate, ethyl (meth)acrylate, n-propyl (meth)acrylate, isopropyl (meth)acrylate, n-butyl (meth)acrylate, isobutyl (meth)acrylate and t-butyl (meth)acrylate. Methyl (meth)acrylate and ethyl (meth)acrylate are more preferable from the view points of the improvement in the strength of the resin composition and the durability in the photochromic properties.

The combination use of the mono(meth)acrylate compound of the formula (V) with the compound of the formula (I) is advantageous because it brings about a resin improved in moldability, low water absorption, heat resistance, impact resistance and mechanical strength. The alicyclic hydrocarbon group having 5 to 16 carbon atom represented by R¹⁰ in the formula (V) is preferably a monocyclic ring having 5 to 8 carbon atoms, or a crosslinked ring having 6 to 12 carbon atoms (for example, norbornyl group, adamantyl group, and isobornyl). One or more hydrogen atoms contained in these alicyclic hydrocarbon groups may be substituted. Examples of the substituent include hydroxyl; substituted amino such as methylamino and dimethylamino; $C_{1-4}$ alkoxy such as methoxy, ethoxy and t-butoxy; $C_{1-15}$ aralkoxy such as benzyloxy; $C_{1-16}$ aryloxy such as phenoxy and 1-naphthoxy; $C_{1-4}$ alkyl such as methyl, ethyl and t-butyl; halogen such as fluorine, chlorine and bromine; cyano; carboxyl; $C_{2-10}$ alkoxycarbonyl such as ethoxycarbonyl; $C_{1-2}$ halogenoalkyl such as trifluoromethyl; nitro; aryl such as phenyl and tolyl; and aralkyl such as benzyl, phenylethyl and phenylpropyl. Specific preferable examples of the compound (V) include cyclopentyl (meth)acrylate, cyclohexyl (meth)acrylate, methylcyclohexyl (meth)acrylate, trimethylcyclohexyl (meth)acrylate, norbornyl (meth)acrylate, isobornyl (meth)acrylate, adamantyl (meth)acrylate, dicyclopentanyl (meth)acrylate and dicyclopentenyl (meth)acrylate. Of these, cyclohexyl (meth)acrylate, norbornyl (meth)acrylate, isobornyl (meth)acrylate, adamantyl (meth)acrylate and dicyclopentanyl (meth)acrylate are preferred.

The di(meth)acrylate compound the formula (VI) has crosslinking properties, and the combination use of this compound with the compound of the formula (I) is advantageous because it brings about a resin having improved mechanical strength. The number "n" for the ethylene or propylene glycol in the compound is from 1 to 10, and n of 3 to 5 is particularly preferred from the viewpoints of the heat resistance, brittleness and water absorption of the resin.

The other monomers can be used either singly or in combination of two or more selected from any one of the groups and/or from among the groups.

In the case where the other polymerizable monomers are used in combination with the di(meth)acrylate compound of the formula (I), the amount of each monomer component can be suitably selected in consideration of the type of the monomer used and the combination of the monomers. However, when refraction index, adhesion to a coat film, photochromic color changeable properties and durability in the photochromic properties are taken into consideration, the amount of the di(meth)acrylate compound of the formula (I) is, in general, preferably 20% by weight or more, more preferably from 20 to 70% by weight of the total amount of the monomers used.

In particular, it is preferable to control the refraction index of the resulting resin to 1.54 or more by adjusting the amount of the monomer which can be a homopolymer having a refraction index of 1.55 or more. Further, when a monomer which can be a homopolymer having a refraction index of less than 1.55 is used along with the compound of the formula (I), it is preferable from the viewpoint of refraction index that the di(meth)acrylate compound of the formula (I) be used in an amount of 40% by weight or more of the total amount of the monomers used.

On the other hand, in the case where the mono(meth)acrylate represented by the formula (II) is used along with the compound (I), the amount of the compound (II) is preferably from 5 to 40% by weight of the total amount of the monomers for improving the mechanical strength and the heat resistance of the resin. Further, in the case where the di(meth)acrylate represented by the formula (III) is used along with the compound (I), the amount of the compound (III) is preferably from 5 to 40% by weight of the total amount of the monomers for improving the mechanical strength of the resin and the adhesion of a coat film.

Further, in the case where the mono(meth)acrylate represented by the formula (IV) is used along with the compound (I), the amount of the compound (IV) is preferably from 5 to 30% by weight of the total amount of the monomers for improving the photochromical color change properties and the durability of the resin and the polymerization-molding properties. Further, in the case where the mono(meth)acrylate represented by the formula (V) is used along with the compound (I), the amount of the compound (V) is preferably from 5 to 30% by weight of the total amount of the monomers for improving the mechanical strength of the resin and the durability in the photochromic properties. Furthermore, in the case where the di(meth)acrylate compound represented by the formula (VI) is used along with the compound (I), the amount of the compound (VI) is preferably from 5 to 40% by weight of the total amount of the monomers for improving the mechanical strength of the resin and the photochromical color change properties.

A specific example of the combination of the above monomers which is most preferable in the present invention is as follows:

from 40 to 70% by weight of the di(meth)acrylate represented by the formula (I), from 5 to 30% by weight of the mono(meth)acrylate represented by the formula (IV), from 5 to 30% by weight of the mono(meth)acrylate represented by the formula (V), and from 5 to 40% by weight of the di(meth)acrylate represented by the formula (VI).

Another preferable combination of the monomers is as follows:

from 20 to 60% by weight of the di(meth)acrylate represented by the formula (I), from 5 to 40% by weight of the mono(meth)acrylate represented by the formula (II) and/or the mono(meth)acrylate represented by the formula (III), from 5 to 30% by weight of the mono(meth)acrylate represented by the formula (IV), from 5 to 30% by weight of the mono(meth)acrylate represented by the formula (V), and from 5 to 40% by weight of the di(meth)acrylate represented by the formula (VI).

Component (b): Photochromic Compound

In the present invention, any photochromic compound can be used as the photochromic compound without any limitation. An advantage of the use of the compound (I) is such that basically any photochromic compound can be used in combination with the compound (I).

Specific examples of the photochromic compound which can be favorably used in the present invention include spirooxazine compounds, fulgide compounds, fulgimide compounds, spiropyrane compounds and chromene compounds.

In these photochromic compounds, the compound which is not highly dependent on temperature and is capable to change to gray or brown is preferred when excellent color changing properties and durability in a resin composition are needed and the spectacles are intended as a final product. Particularly preferable examples of the photochromic compound include one or more compounds selected from spirooxazine, fulgide and fulgimide compounds, which can change to blue to orange. Further chromene compounds which can change to orange to yellow is also preferably used. Any of these photochromic compounds when used in combination with the compound (I) shows excellent color change properties and durability in a resin composition.

These photochromic compounds can be used either singly or in combination of two or more. In particular, a half tone such as gray or brown can be attained by blending a spirooxazine, fulgide or fulgimide compound which can change to blue to orange, and a chromene compound which can change to orange to yellow.

In the present invention, the photochromic compound can be blended with the compound (I) at any ratio as long as the amount of the photochromic compound is enough to impart photochromic properties to the resulting photochromic resin. However, the amount of the photochromic compound is preferably from 0.01 to 5 parts by weight, more preferably from 0.1 to 1 part by weight for 100 parts by weight of the di(meth)acrylate represented by the formula (I). When the ratio of the photochromic compound is in the above range, an excellent and stable durability in the photochromic properties can be obtained. Further, such a phenomenon as the coagulation of the photochromic compound can be effectively prevented.

Examples of the spirooxazine compound which can be favorably used in the present invention include a compound represented by the following formula (VII); the compound can change to violet to blue violet:

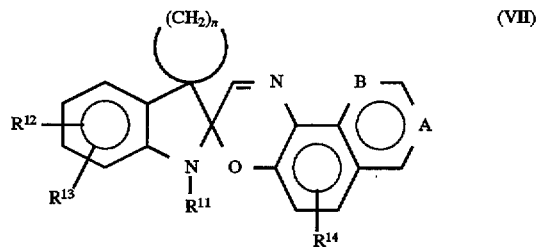

wherein either one of A and B represents N, and the other one represents CH, n is an integer of 4 to 6, $R^{11}$ represents hydrocarbon or alkoxycarbonylalkyl, $R^{12}$ and $R^{13}$ each independently represent hydrogen, halogen, hydrocarbon, alkoxyl, nitro, cyano, halogenoalkyl or alkoxycarbonyl, and $R^{14}$ and $R^{15}$ each independently represent hydrogen, halogen, hydrocarbon or alkoxyl.

In the formula (VII), hydrocarbon represented by $R^{11}$ is preferably an alkyl group having 1 to 10 carbon atoms, more preferably 1 to 4 carbon atoms, an aryl group having 6 to 10 carbon atoms, or an aralkyl group having 7 to 14 carbon atoms. Examples of the alkyl group include methyl, ethyl and isopropyl. Examples of the aryl group include phenyl and naphthyl. Examples of the aralkyl group include benzyl, phenylethyl, phenylpropyl and naphthylmethyl.

Further, in the formula (VII), the alkoxyl group contained in the alkoxycarbonylalkyl group represented by $R^{11}$ is preferably an alkyl group having 1 to 10 carbon atoms, more preferably analkyl group having 1 to 4 carbon atoms. The alkylene group contained in the alkoxycarbonylalkyl group is preferably an alkylene group having 1 to 10 carbon atoms, more preferably an alkylene group having 1 to 4 carbon atoms. Examples of this alkoxycarbonylalkyl group include methoxycarbonylmethyl, methoxycarbonylethyl, methoxycarbonylpropyl, ethoxycarbonylmethyl, ethoxycarbonylethyl, ethoxycarbonylbutyl and butoxycarbonylethyl.

In the general formula (VII), the halogen atom represented by $R^{12}$ and $R^{13}$ is preferably chlorine or bromine. Examples of the hydrocarbon group represented by $R^{12}$ and $R^{13}$ include those hydrocarbon groups which are described as the examples of $R^{11}$. The alkoxyl group represented by $R^{12}$ and $R^{13}$ is preferably an alkoxyl group having 1 to 10 carbon atoms, more preferably an alkoxyl group having 1 to 4 carbon atoms. Examples of this alkoxyl group include methoxy, ethoxy, propoxy and butoxy. The alkyl part of the halogenoalkyl group represented by $R^{12}$ and $R^{13}$ is preferably an alkyl group having 1 to 4 carbon atoms. Examples of this halogenoalkyl group include trifluoromethyl, trichloromethyl and tribromomethyl. There is no particular limitation on the alkoxycarbonyl group represented by $R^{12}$ and $R^{13}$, but an alkoxycarbonyl group having 2 to 12 carbon atoms is preferred. Examples of the alkoxycarbonyl group include methoxycarbonyl, ethoxycarbonyl, propoxycarbonyl and butoxycarbonyl.

In the formula (VII), $R^{14}$ and $R^{15}$ are hydrogen, halogen, hydrocarbon or alkoxyl. Examples of the halogen atom, hydrocarbon group and alkoxyl group include those atoms and groups which are described as the examples of $R^{12}$ and $R^{13}$.

The compounds represented by the formula (VII) can be used either singly or in combination of two or more.

The compounds represented by the formula (VII) are known compounds, and described, for example, in Japanese Patent Laid-Open Publication No. 112777/1993.

Examples of the fulgide and fulgimide compounds which are favorably used in the present invention include a compound resented by the following formula (VIII); the compound can change to blue to orange:

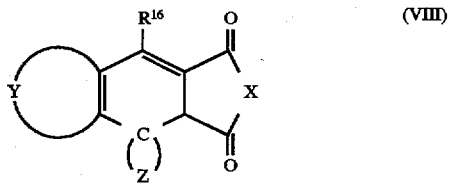

wherein the ring formed with Y represents an aromatic hydrocarbon group which may have a substituent, or an unsaturated heterocyclic group which may be substituted, $R^{16}$ represents alkyl, aryl or heterocyclic, the ring formed with Z represents norbornylidene or adamantylidene, and X represents oxygen or a group >N—$R^{17}$, >N—$A^1$—$B^1$—$(A^2)M$—$(B^2)N$—$R^{18}$, >N—$A^3$—$A^4$, —$A^3$—$R^{19}$ or >N—R where $R^{17}$ represents hydrogen, alkyl or aryl, $A^1$, $A^2$ and $A^3$ each independently represent alkylene, alkylidene, cycloalkylene or alkylcycloalkane-diyl, $B^1$ and $B^2$ each independently represent —O—, —C(=O)—, —OC(=O)—, —OC(=O)O—, —C(=O)NH— or —NHC(=O)—, $R^{18}$ represents alkyl, naphthyl or naphthylalkyl, $A^4$ represents naphthyl, $R^{19}$ represents halogen, cyano or nitro, and R represents cyanoalkyl, nitroalkyl or alkoxycarbonylalkyl, and m and n each independently represent 0 or 1, provided that when m is 0, n is also 0.

Preferable examples of the aromatic hydrocarbon group represented by the ring formed with Y in the general formula (VIII) include a benzene ring, and a condensed ring of two or three benzene rings. Specific examples of this aromatic hydrocarbon group include benzene, naphthalene, phenanthrene and anthracene rings having 6 to 10 carbon atoms. Preferable examples of the unsaturated heterocyclic ring represented by the ring formed with Y include 5-, 6- and 7-membered rings containing one or two oxygen, nitrogen or sulfur atoms, and a condensed ring of the 5-, 6- or 7-membered ring and benzene ring. Specific examples of the unsaturated heterocyclic ring include furan, benzofuran, pyridine, quinoline, isoquinoline, pyrrole, thiophene and benzothiophene rings having 4 to 9 carbon atoms.

One or more hydrogen atoms on these rings may be substituted. Examples of the substituent include a halogen atom; an alkyl group having 1 to 4 carbon atoms, such as methyl or ethyl; an alkoxyl group having 1 to 4 carbon atoms, such as methoxy or ethoxy; an aryl group having 6 to 10 carbon atoms, such as phenyl, tolyl or xylyl; an alkoxyaryl group having 7 to 14 carbon atoms (an aryl group having 6 to 10 carbon atoms, substituted with an alkoxyl group having 1 to 4 carbon atoms); amino group; nitro group; and cyano group.

The alkyl, aryl and heterocyclic groups represented by $R^{16}$ in the formula (VIII) are preferably an alkyl group having 1 to 4 carbon atoms, an aryl group having 6 to 10 carbon atoms, and a 5-, 6- or 7-membered ring having one or two oxygen, nitrogen or sulfur atoms, or a condensed ring of this 5-, 6- or 7-membered ring and benzene as described in the definition of the ring formed with Y, respectively.

Examples of the alkyl and aryl groups represented by $R^{17}$ in the formula (VIII) include those described as the examples of the above $R^{10}$.

The alkylene group represented by $A^1$, $A^2$ and $A^3$ is preferably methylene, ethylene, propylene, trimethylene or tetramethylene having 1 to 4 carbon atoms, and the alkylidene group represented by $A^1$, $A^2$ and $A^3$ is preferably ethylidene, propylidene or isopropylidene group having 2 to 4 carbon atoms. The cycloalkylene group and the alkylcycloalkane-diyl group represented by $A^1$, $A^2$ and $A^3$ are preferably cyclohexylene and dimethylcyclohexane-diyl, respectively.

Examples of the alkyl group represented by $R^{18}$ in the formula (VIII) include those alkyl groups described as the examples of the above $R^{16}$, and the naphthylalkyl group represented by $R^{18}$ is preferably naphthylmethyl or naphthylethyl having 11 to 14 carbon atoms.

Further, the cyanoalkyl group represented by R is preferably a cyanoalkyl group having 1 to 4 carbon atoms (i.e., cyano$C_{1-3}$alkyl). The nitroalkyl group represented by R is preferably a nitroalkyl group having 1 to 4 carbon atoms. The alkoxycarbonylalkyl group represented by R is preferably an alkoxycarbonylalkyl group having 3 to 9 carbon atoms (i.e., comprising an alkoxyl group having 1 to 4 carbon atoms and an alkylene group having 1 to 4 carbon atoms).

Of the compounds represented by the formula (VIII), a compound in which $R^{16}$ is alkyl and X is a group >N—R is more preferable in view of the durability in the photochromic action. Further, another preferred compound is a compound in which the ring formed with Z is adamantylidene and the ring formed with Y is a heterocyclic, in particular, thiophene group, which may be substituted with aryl having 6 to 10 carbon atoms or alkoxyaryl having 7 to 14 carbon atoms (i.e., aryl having 6 to 10 carbon atoms substituted with alkoxyl having 1 to 4 carbon atoms).

The compound represented by the formula (VIII) can be used either singly or in combination of two or more.

The compound represented by the formula (VIII) is known and described, for example, in Japanese Patent Laid-Open Publication No. 52778/1989.

Any of the spirooxazine compounds (for example, compounds of the formula (VII)) and the fulgide and fulgimide compounds (for example, compounds of the general formula (VIII)) can be favorably used in the present invention. However, the fulgide and fulgimide compounds are more preferable in view of color change properties, color-fading properties and temperature dependency.

Examples of the chromene compound which can be favorably used in the present invention include a compound represented by the formula (IX). The chromene compound can generally change to orange to yellow, and also can change to a half tone such as gray or brown when blended with the spirooxazine compound or the fulgide or fulgimide compound.

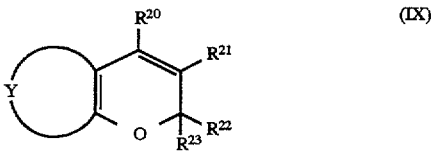

wherein $R^{20}$, $R^{21}$, $R^{22}$ and $R^{23}$ each independently represent hydrogen, alkyl, aryl, a substituted amino or a saturated heterocyclic group, or $R^{22}$ and $R^{23}$ may form a ring, and the ring formed with Y represents an aromatic ring or an unsaturated heterocyclic ring, in which one or more hydrogen atoms may be substituted by an alkyl group having 1 to 20 carbon atoms or an alkoxyl group having 1 to 20 carbon atoms.

In the general formula (IX), the alkyl group represented by $R^{20}$, $R^{21}$, $R^{22}$ and $R^{23}$ is preferably an alkyl group having 1 to 4 carbon atoms. The aryl group represented by $R^{20}$, $R^{21}$, $R^{22}$ and $R^{23}$ is preferably an aryl group having 6 to 10 carbon atoms, such as phenyl, tolyl or xylyl. The substituted amino group represented by $R^{20}$, $R^{21}$, $R^{22}$ and $R^{23}$ is preferably amino group in which one or more hydrogen atoms are substituted by the above alkyl or aryl. Examples of the saturated heterocyclic group represented by $R^{20}$, $R^{21}$, $R^{22}$ and $R^{23}$ include monovalent groups derived from a 5- or 6-membered ring containing one or two nitrogen, oxygen or sulfur atoms, such as pyrrolidine, imidazolidine, piperidine, piperazine and morpholine.

In the general formula (IX), the ring formed by $R^{22}$ and $R^{23}$ is preferably norbornylidene or bicyclo(3,3,1)9-nonylidene.

Examples of the aromatic hydrocarbon group represented by the ring formed with Y in the formula (IX) include a benzene ring, and a condensed ring of 2 or 3 benzene rings. Specific examples of this aromatic hydrocarbon group include benzene, naphthalene, phenanthrene and anthracene rings having 6 to 14 carbon atoms. Preferable examples of the unsaturated heterocyclic ring represented by the ring formed with Y include 5-, 6- and 7-membered rings having one or two oxygen, nitrogen or sulfur, and a condensed ring of the 5-, 6- or 7-membered ring and benzene. Specific examples of the unsaturated heterocyclic ring include furan, benzofuran, pyridine, quinoline, isoquinoline, pyrrole, thiophene and benzothiophene rings having 4 to 9 carbon atoms.

One or more hydrogen atoms on the above rings may be substituted. Examples of the substituent include a halogen atom; an alkyl group having 1 to 20 carbon atoms, such as methyl or ethyl; an alkoxyl group having 1 to 20 carbon atoms, such as methoxy or ethoxy; an aryl group having 6 to 10 carbon atoms, such as phenyl, tolyl or xylyl; amino; nitro; and cyano.

Of the compounds represented by the formula (IX), a more preferable compound is one in which both $R^{20}$ and $R^{21}$ are hydrogen, $R^{22}$ and $R^{23}$, which may be the same or different, are an alkyl group having 1 to 4 carbon atoms, or combined together to form bicyclo(3,3,1)9-nonylidene or norbornylidene, and the ring formed with Y is naphthalene which may be substituted by an alkyl group having 1 to 20 carbon atoms or an alkoxyl group having 1 to 20 carbon atoms.

The compounds represented by the formula (IX) can be used either singly or in combination of two or more.

The compound represented by the formula (IX) is known, and described, for example, in Japanese Patent Laid-Open Publication No. 121,188/1991.

Other Components

It is possible to improve the durability in the photochromic properties by adding an ultraviolet stabilizer, if necessary.

Preferable examples of the ultraviolet stabilizer include hindered amine light stabilizers, hindered phenol antioxidants, phosphite antioxidants and thioether antioxidants. It is particularly preferable to use at least one hindered amine light stabilizer and at least one phosphite antioxidant in combination.

Specific examples of the hindered amine light stabilizer include bis(2,2,6,6-tetramethyl-4-piperidyl)sebacate, bis(1, 2,2,6,6-pentamethyl-4-piperidyl)sebacate, 1-[2-[3-(3,5-di-t-butyl-4-hydroxyphenyl)propionyloxy]ethyl]-4-[3-(3,5-di-t-butyl-4-hydroxyphenyl)-propionyloxy]2,2,6,6-tetramethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpiperidine, 2,2,6,6-tetramethyl-4-methacryloyloxy-piperazine and 1,2,2,6,6-pentamethyl-4-methacryloyloxy-piperazine.

Other preferable examples of the hindered amine light stabilizer include a hindered amine light stabilizer represented by the following formula (X):

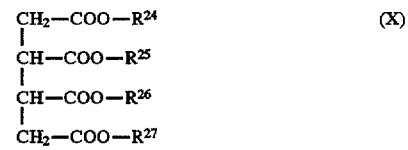

wherein all of $R^{24}$, $R^{25}$, $R^{26}$ and $R^{27}$ are 2,2,6,6-tetramethyl-4-methacryloyloxy-piperidyl group. Other examples include:

a hindered amine light stabilizer represented by the formula (X) wherein all of $R^{24}$, $R^{25}$, $R^{26}$ and $R^{27}$ are 1,2,2,6, 6-pentamethyl-4-methacryloyloxy-piperidyl group;

a hindered amine light stabilizer represented by the formula (X) wherein at least one of $R^{24}$, $R^{25}$, $R^{26}$ and $R^{27}$ is 2,2,6,6-tetramethyl-4-methacryloyloxy-piperidyl group, and the others are tridecyl group; and a hindered amine light stabilizer represented by the formula (X) wherein at least one of $R^{24}$, $R^{25}$, $R^{26}$ and $R^{27}$ is 1,2,2,6,6-pentamethyl-4- methacryloyloxy-piperidyl group, and the others are tridecyl.

Still other preferable examples of the hindered amine light stabilizer include those represented by the following formula (XI):

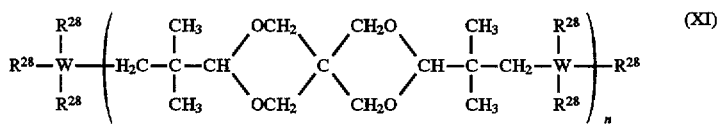

wherein n is an integer of 1 to 5, W represents a tetravalent group represented by the following formula (XII):

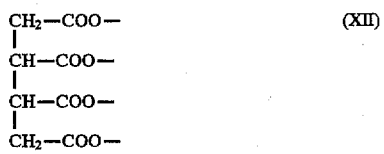

where $R^{28}$s independently represent 2,2,6,6-tetramethyl-4-methacryloyloxy-piperidyl group or 1,2,2,6,6-pentamethyl-4-methacryloyloxy-piperidyl group.

Preferable examples of the above phosphite antioxidant include tridecyl phosphite, triphenyl phosphite, octyldiphenyl phosphite, decyldiphenyl phosphite, didecylphenyl phosphite, tris(nonylphenyl) phosphite, 4,4'-isopropylidenediphenolalkyl phosphite (the number of carbon atoms contained in the alkyl group being from 12 to 15), hydrogenated bisphenol-pentaerythritol phosphite polymer and hydrogenated bisphenol A-phosphite polymer.

The amount of the ultraviolet stabilizer is preferably in the range of 0.001 to 2 parts by weight for 100 parts by weight of the total amount of the monomers and the photochromic compound.

Photochromic Resin & Photochromic Lens

A photochromic resin of the present invention can be obtained by subjecting the photochromic composition of the present invention to polymerization which is conducted under such conditions that the monomers (the component (a) and other monomers) can be polymerized.

There is no particular limitation on the method of polymerization hardening. It can be suitably selected in consideration of the intended use of the photochromic resin to be obtained. Further, the method of molding can also be selected in the same manner.

For instance, in order to obtain a photochromic lens, a photochromic composition of the present invention comprising an ultraviolet stabilizer and a polymerization initiator may be poured into a mold made of two sheets of mirror-polished glass with a gasket made of an ethylene-vinyl acetate copolymer, and polymerized by heating to obtain a molded product. Thereafter, the molded product may be shaped into a lens by polishing.

Examples of the polymerization initiator which can be favorably used for the hardening conducted in this embodiment include various radical polymerization initiators. Specific examples of such initiators include benzoyl peroxide, t-butyl-oxy-2-ethyl hexanoate, t-butyl peroxypivalate, t-butyl peroxyisobutylate, t-butyl peroxyneodecanoate, t-butyl peroxyisopropylcarbonate, lauroyl peroxide, azobisiso-butylonitrile and azobis(2,4-dimethylvaleronitrile). These initiators can be used either singly or in combination of two or more. Further, in order to enhance the moldability of the resin composition, a polymerization modifier may also be used in addition to the polymerization initiator. Specific examples of the polymerization modifier include normaldodecylmercaptan, normaloctylmercaptan, thioglycerol, and alpha-methylstyrene dimer. The alpha-methylstyrene dimer is particularly preferred because the thiol compound sometimes accelerates the deterioration of the photochromic compound, which is caused during the polymerization of the photochromic composition, or after color change is conducted repeatedly. The acceptable amount of the polymerization initiator is approximately 0.001 to 5 parts by weight for 100 parts by weight of the total amount of the monomers and the photochromic compound. Further, the acceptable amount of the polymerization modifier is also the same as the above. Furthermore, when the monomers are poured into the mold and polymerized, an adhesion-imparting agent may also be added in order to enhance the adhesion between the resin and the mold at the time of the polymerization hardening. Specific examples of this adhesion-imparting agent include glycidyl methacrylate and 2-hydroxyethyl methacrylate. The preferable amount of the adhesion-imparting agent is approximately 0.001 to 10 parts by weight for 100 parts by weight of the monomers used.

The hardening of the composition of the present invention can also be conducted by using a photo-setting type polymerization initiator along with the above polymerization initiator, and applying light and heat in combination. In this context, when the time for applying light is too long, the photochromic compound undergoes deterioration, and the mechanical strength of the resin tends to be lowered. It is therefore preferable that light be applied until the resin is gelled and that heat be utilized to completely harden the resin.

In these method, not only the glass-made mold but also a mold made of glass and a plastic plate, glass and a metal plate, or a combination thereof can be used. Further, besides the thermoplastic resin, a polyester-made adhesive tape can also be used as the gasket.

Also in the case where the photochromic resin according to the present invention is used for purposes other than lenses, polymerization and molding can be conducted in the above manner.

Since the photochromic resin according to the present invention can be made into a thin and light-weight shape, and has excellent optical properties, it can be suitably used, in particular, for photochromic lenses.

When the photochromic resin of the invention is used for a lens, it is preferable to provide an antireflection film on the surface of the lens in order to increase the light transmission of the lens by preventing flickering which is caused by the light reflected on the surface of the lens. Further, in order to improve the adhesion between the lens base and the antireflection film and to protect the surface of the lens from being flawed, it is particularly preferable to provide a hard coat layer on the surface of the lens base. The photochromic resin according to the present invention is advantageous in that the adhesion to the hard coat layer is extremely high although the resin contains an aromatic ring.

Preferable examples of the hard coat layer include a layer obtained by applying a coating composition containing as its main components the following (a) and (b), and hardening the composition:

(a) one or more silane compounds having at least one reactive group; and (b) one or more metal fine powders selected from a metal fine powder of silicon oxide, antimony oxide, zirconium oxide, titanium oxide, lead oxide, tantalum oxide, tungsten oxide or aluminum oxide; a composite metal fine powder of two or more metal oxides selected from titanium oxide, cerium oxide, zirconium oxide, silicon oxide and iron oxide; and a composite metal fine powder obtained by coating lead oxide fine powder with a composite metal fine powder of lead oxide and tungsten oxide.

The component (b) is effective to control the refraction index and to enhance the hardness of the hard coat layer. The compounds listed as the examples of the component (b) can be used either singly or in combination. In general, a hard coat layer can be formed by using the component (b) only.

In this case, however, there may be a case where film-forming properties cannot be fully obtained. A hard coat layer which is transparent and strong can be obtained by the combination use of the component (a) and the component (b). Although the component (a) can be used as it is, it is preferable to use the component after subjected to hydrolysis because such a compound can provide a film having improved water resistance and hardness.

The preferable thickness of the hard coat layer is, in general, approximately 0.2 to 10 μm, and the more preferable thickness is approximately 1 to 3 μm.

According to the preferred embodiment of the present invention, it is preferable to provide a primer layer between the lens base and the hard coat layer. The primer layer improves the impact resistance of the lens and ensures the adhesion of the hard coat to the lens. This primer layer can be obtained by coating any of the following coating compositions, followed by drying. Specific examples of the coating composition for forming the primer layer include a composition comprising urethane resin, acryl resin or epoxy resin.

The hard coat layer and the primer layer can be formed in the following manner: starting materials for the layer are diluted with a suitable alcoholic or aqueous solvent, and the dilution is coated by a conventional coating method such as dipping, spin or spray coating, and then hardened by heating. The hardening can be conducted by simply heating the layer coated. It is however preferable to add a suitable hardening catalyst because a hard film can be obtained in a shorter time by the addition of such a catalyst. Examples of the hardening catalyst include perchlorates such as magnesium perchlorate and ammonium perchlorate, and chelate compounds such as aluminum acetylacetonate.

With respect to the hard coat layer, excellent film properties can be fully obtained by using the components (a) and (b) only. However, it is possible to add other components in order to improve the appearance of the hard coat layer, or to impart durability or other functions to the layer.

For example, in order to improve the water resistance of the hard coat layer, or to impart dyeability to the layer, it is preferable to add a compound selected from polyhydric alcohols, polyvalent carboxylic acids, polyvalent carboxylic anhydrides and epoxy compounds. Examples of the polyhydric alcohol which can be favorably used include bifunctional alcohols such as (poly)ethylene glycol, (poly)propylene glycol, neopentyl glycol, catechol, resorcinol and alkane diol; trifunctional alcohols such as glycerol and trimethylolpropane; and polyvinyl alcohol. Examples of the polyvalent carboxylic acid include malonic acid, succinic acid, adipic acid, azelaic acid, maleic acid, o-phthalic acid, terephthalic acid, fumaric acid, itaconic acid and oxalacetic acid. Examples of the polyvalent carboxylic anhydride include succinic anhydride, maleic anhydride, iraconic anhydride, 1,2-dimethylmaleic anhydride, phthalic anhydride, hexahydrophthalic anhydride and naphthalic anhydride. Examples of the epoxy compound include diglycidyl ethers of bifunctional alcohols such as (poly)ethylene glycol, (poly)propylene glycol, neopentyl glycol, catechol, resorcinol and alkane diol, and di- or triglycidyl ethers of trifunctional alcohols such as glycerol and trimethylolpropane. When any of these additives is used, a film having high hardness can be obtained by adding, in particular, a hardening catalyst.

Further, in order to prevent the hard coat layer from undergoing deterioration by ultraviolet light, it is preferable to add an ultraviolet absorber, an antioxidant or a light stabilizer. Preferable specific examples of the ultraviolet absorber, antioxidant and light stabilizer include compounds of salicylic acid ester type, benzophenone type, benzotriazole type, cyanoacrylate type, nickel complex salt type, phenol type and hindered amine type.

Furthermore, in order to prevent failure in coating such as orange peel and cissing, it is preferable to use a surface active agent or a flow-controlling agent. In particular, the use of a silicone- or fluorine-containing surface active agent is effective.

In the case of the photochromic lens, it is possible to further improve the optical properties of the lens by providing an antireflection film on the surface of the hard coat layer. The antireflection film is well known in the art and is, for example, a multi-layered film obtainable by laminating those thin films which are different in refraction index. There is no particular limitation on the antireflection film as long as it can decrease the reflectivity of the lens. Preferred examples of an antireflection film made form an inorganic compound or inorganic compound. The film may be a single layer or laminated layers.

The inorganic film may be made by, for example, vacuum deposition, ion plating and sputtering method. Specific examples of the inorganic compound include a metalic oxide or fluoride such as silicon oxide, aluminum oxide, zirconium oxide, titanium oxide, cerium oxide, hafnium oxide or magnesium fluoride. The inorganic compound may be employed as mixtures.

The organic film may be made by, for example, preparing an organic solution with a suitable viscosity of an organic compound to be a film such as natural resins or synthetic resin, applying the organic solution with spin method or dipping method to form a film, and then hardening the film with heat. Specific example of the organic solution may include a metalic oxide such as silicon oxide, titanium oxide and zirconium oxide and fluoride.

From the viewpoints of the hardness of the surface and the prevention of interference fringe, it is more preferable to provide an antireflection film composed of a single layer or multiple layers made from an inorganic compound.

The present invention will now be explained more specifically by referring to the following examples. However, the present invention is not restricted to the following descriptions only.

The abbreviations of the monomers used in the following Examples and Comparative Examples are as follows:

Di(meth)acrylate compounds represented by the formula (I):

METX: p-bis(2-methacryloyloxyethylthio)xylylene
MPTX: p-bis(3-methacryloyloxypropylthio)xylylene
Other polymerizable monomers
BZMA: benzyl methacrylate
PHMA: phenyl methacrylate
PHEMA: phenoxyethyl methacrylate
BPE: 2,2-bis[4-(methacryloyloxyethoxy)phenyl]-propane
BBPE: 2,2'-bis[(3,5-dibromo-4-methacryloyloxyethoxy)phenyl]propane
MMA: methyl methacrylate
EMA: ethyl methacrylate
IBM: isobornyl methacrylate
DCPM: dicyclopentanyl methacrylate
4EGM: tetraethylene glycol dimethacrylate
4PGM: tetrapropylene glycol dimethacrylate Photochromic compounds Compound S—a: the spirooxazine compound represented by the formula (S—a):

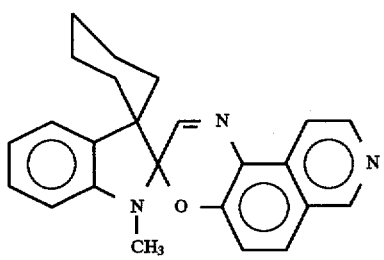
(S-a)

Compound F—a: the fulgimide compound represented by the formula (F—a):

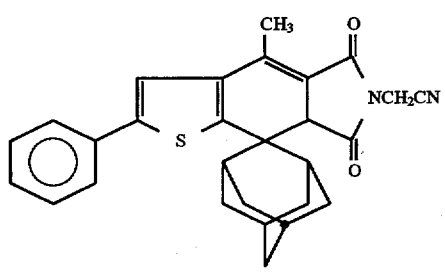
(F-a)

Compound F—b: the fulgimide compound represented by the formula (F—b):

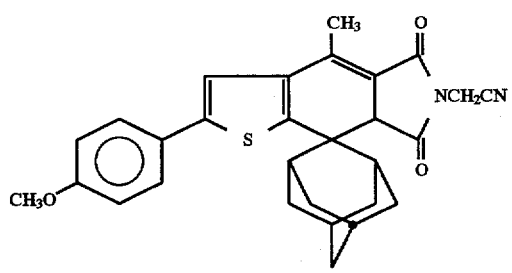
(F-b)

Compound C—a: the chromene compound represented by the formula (C—a):

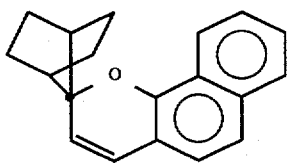
(C-a)

Compound C—b: the chromene compound represented by the formula (C—b):

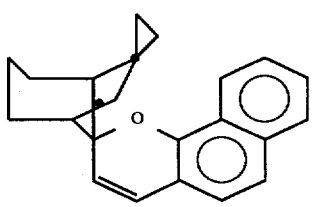
(C-b)

The coating compositions used for forming hard coat layers and the primer compositions are prepared in the following manners:

Coating composition (a):

Twenty third (23) g of gamma-glycidoxypropyl trimethoxysilane, 45 g of colloidal silica dispersed in methanol ("OSCAL-1132" manufactured by Shokubai Kagaku Kabushiki Kaisha), and 32 g of methyl cellosolve were thoroughly stirred. To this mixture was added 2 g of 0.05N hydrochloric acid, and the mixture was stirred for 30 minutes. 0.03 g of a silicone-containing surface active agent ("L-7604" manufactured by Nippon Unicar Co., Ltd.) was further added to the mixture, and the resultant was stirred to obtain Coating composition (a).

Coating compositions (b), (c) and (d):

Coating compositions (b), (c) and (d) having a composition shown in Table 5 were respectively prepared in the same manner as in the preparation of Coating composition (a).

Primer composition (a):

Twenty (20) g of an emulsion of an acryl-styrene copolymer ("Cebian A4710" manufactured by Daicel Chemical Industries, Ltd.), 17 g of water, 70 g of ethyl cellosolve, and 15 g of N, N-dimethylformamide were stirred for 30 minutes. To this mixture was further added 0.03 g of a silicone-containing surface active agent ("L-7604" manufactured by Nippon Unicar Co., Ltd.), and the resultant was stirred to obtain Primer composition (a).

Primer composition (b):

A primer composition ("Crystal Coat CP-607" manufactured by Nippon ARC Co., Ltd.) was used as Primer composition (b).

EXAMPLE 1

A mixture of 45 g of METX, 25 g of PHEMA, 12 g of MMA, 12 g of IBM, 6 g of 4EGM, 0.06 g of Compound F—a, 0.06 g of Compound F—b, 0.065 g of Compound C—a, 0.2 g of a hindered amine light stabilizer ("LA-63" manufactured by ASAHI DENKA KOKYO K.K.), 0.3 g of tridecyl phosphite, 1 g of alpha-methylstyrene dimer, 1 g of glycidyl methacrylate and 1.0 g of t-butyl peroxyneodecanoate were thoroughly stirred at room temperature. The pressure was then reduced to 50 mmHg, and deaeration was conducted for 10 minutes. The composition thus obtained was poured into a mold made of mirror-polished glass, with a gasket made from an ethylene-vinyl acetate copolymer, and maintained at a temperature of 35° C. for 10 hours. Thereafter, the temperature was gradually raised from 35° C. to 100° C. over a period of 7 hours, and the composition was maintained at 100° C. for two hours, thereby conducting molding. The lens was taken out from the mold, and heated at 100° C. for 2 hours, thereby finishing the lens by annealing treatment.

The lens thus produced was evaluated by the following tests. The results were as shown in Table 3.

Evaluation Tests

Refraction Index:

The refraction index of the lens was determined by an Abbe's refractometer, applying D-light of 589.3 nm.

Saturated Vapor Absorption:

The lens was placed on a discoid plate having a thickness of 5 mm, and allowed to stand at 70° C. for 3 days in 100% saturated vapor. An increase in the weight of the lens was measured.

Heat Resistance:

Tg of the lens under a load of 10 g was measured by a TMA tester.

Falling Ball Test:

A steel ball was allowed to fall from the height of 127 cm on the center of a lens whose thickness at the center thereof was 1.5 mm. This was repeated five times by using five sheets of the lens. The average weight of the steel balls with which the lenses were broken or cracked was obtained by calculation.

Bending Test:

The modules of elasticity of the lens was measured in accordance with JIS K7203.

Shape of Lens:

The curve of the lens at the center thereof was visually observed, and rated in accordance with the following standard:

A: Not curved at all (the difference between the design curvature and the curvature after molding is from 0 to 1%)

B: Slightly curved (the difference is from 1 to 3%)

C: Curved a little (the difference is from 3 to 5%)

D: Curved (the difference is from 5 to 10%)

E: Extremely curved (the difference is from 10 to 20%)

F: Unusable (the difference is 20% or more)

EXAMPLE 2

A lens was prepared in the same manner as in Example 1, by using a composition consisting of 100 g of the monomers shown in Table 1, 0.12 g of Compound S—a, 0.065 g of Compound C—a, and the same amounts of the ultraviolet stabilizer, the polymerization initiator, the polymerization modifier and the adhesion-imparting agent as in Example 1.

The same tests for evaluation as in Example 1 were carried out to evaluate the lens obtained. The results were as shown in Table 3.

EXAMPLES 3 to 8

Lenses were prepared in the same manner as in Example 1, by using compositions each consisting of 100 g of the monomers shown in Table 1, and the same amounts of the photochromic compound, the ultraviolet stabilizer, the polymerization initiator and the polymerization modifier as in Example 1. The same tests for evaluation as in Example 1 were carried out to evaluate the lenses obtained. The results were as shown in Table 3.

EXAMPLES 9 and 10

Lenses were prepared in the same manner as in Example 1, by using compositions each consisting of 100 g of the monomers shown in Table 1, 0.12 of Compound S—a, 0.065 g of Compound C—b, and the same amounts of the ultraviolet stabilizer, the polymerization initiator, the polymerization modifier and the adhesion-imparting agent as in Example 1.

The same tests for evaluation as in Example 1 were carried out to evaluate the lenses obtained. The results were as shown in Table 3.

COMPARATIVE EXAMPLE 1

A mixture of 100 g of CR 39 (diethylene glycol bisallylcarbonate), 0.06 g of Compound F—a, 0.06 g of Compound F—b, 0.065 g of Compound C—a, and 3 g of diisopropyl peroxydicarbonate were thoroughly stirred. The mixture was then poured into the same mold as in Example 1, and maintained at 45° C. for 10 hours, at 60° C. for 3 hours, at 80° C. for 3 hours and at 95° C. for 6 hours for molding. The lens was taken out from the mold, and heated at 120° C. for one hour, thereby finishing the lens by annealing treatment.

The lens thus obtained was evaluated by the same methods as in Example 1. The results were as shown in Table 4.

COMPARATIVE EXAMPLES 2 TO 5

Lenses were prepared in the same manner as in Example 1, by using compositions each consisting of 100 g of the monomers shown in Table 2, and the same amounts of the photochromic compound, the ultraviolet stabilizer, the polymerization initiator and the polymerization modifier as in Example 1.

The same tests for evaluation as in Example 1 were carried out to evaluate the lenses obtained. The results were as shown in Table 4.

EXAMPLE 11

The lens prepared in Example 1 was dipped in Coating composition (a), and pulled out at a speed of 20 cm/minute, thereby coating the lens with the composition. The lens was then heated at 130° C. for 1.5 hours, thereby drying the coated layer to form a hard coat layer.

On the surface of the hard coat layer, an antireflection film (a) was formed by means of vacuum deposition. Specifically, films of $ZrO_2$ 0.13λ/$SiO_2$ 0.06λ/$ZrO_2$ 0.25λ/ $SiO_2$ 0.25 (the design wavelength λ=520 nm) were successively formed on the lens base made of the photochromic resin, thereby forming an antireflection film.

The photochromic lens thus obtained was evaluated by the following tests. The results were as shown in Table 6.

Evaluation Tests

Hard Coat Adhesion:

A test was carried out by the cross-cut tape method in accordance with JIS K5400. The percentage of the hard coat layer remaining on the surface of the lens was indicated by such a score that is given every 10% of the percentage, i.e., when the percentage is from 91 to 100%, the score given is 10, when the percentage is from 81 to 90%, the score given is 9, and so forth.

Photochromic Color Change Properties:

The lens was placed in a thermoplastic chamber kept at a temperature of 20° C. Light was applied to the lens from a distance of 15 cm by using an artificial sunshine lamp ("XC-100" manufactured by Serick Co., Ltd.) for 5 minutes, whereby the lens was allowed to develop a color. The absorbances at a wavelength shown in Table 6 before and after the color change were referred to as A0 and A5, respectively, and a color density was obtained as the difference between A5 and A0 (A5–A0).

Compound S—a has the maximum absorption wavelength at 595 nm. Further, 580 nm is the maximum absorption wavelength of Compounds F—a and F—b, and 440 nm is that of Compounds C—a and C—b.

Durability in Photochromic Properties:

The fatigue life of the lens was measured by a xenon long-life fadeometer "FAL-25AX-HC" manufactured by Suga Test Instruments Co., Ltd. The fatigue life $T_{1/2}$ is indicated by a time required for the absorbance at the maximum absorption wavelength of Compound S—a, F—a, F—b or C—a to become ½ of the initial (T0) absorbance.

It is noted that both the absorbance at T0 and the absorbance at T½ are the values obtained by subtracting the absorbance of the lens which is not exposed to light.

EXAMPLES 12 TO 18 AND COMPARATIVE EXAMPLES 6 to 10

On the surface of the lenses obtained in Examples 2 to 8 and Comparative Examples 1 to 5, the same hard coat layer as in Example 11, or a hard coat layer shown in Table 5 was provided. On this hard coat layer, antireflection film (a) which is prepared by the same method as in Example 11 or an antireflection film (b) which is prepared by vacuum deposition method was further provided. Thus, lenses of Examples 12 to 18 and Comparative Examples 6 to 10 were respectively obtained. It is noted that the antireflection film (b) shown in Table 6 consists of $SiO_2$ $0.06\lambda/ZrO_2$ $0.13/SiO_2$ $0.06\lambda/ZrO_2$ $0.25\lambda/SiO_2$ $0.25\lambda$ (provided that $\lambda=520$ nm) which were successfully provided on the lens base in the mentioned order.

The adhesion to the hard coat layer and the photochromic color change properties of the lens were evaluated by the same methods as in Example 11. The results were as shown in Table 6.

EXAMPLE 19

The lens obtained in Example 9 was dipped in Primer composition (a), and pulled out at a speed of 10 cm/minute, thereby coating the lens with the composition. The lens was then heated at 60° C. for 0.5 hours to form a primer layer. Coating composition (a) shown in Table 5 was further coated onto this primer layer, and the same antireflection film as in Example 11 was provided thereon to obtain a lens of Example 19.

The adhesion to the hard coat layer and the photochromic color change properties of the lens were evaluated by the same methods as in Example 11. The results were as shown in Table 6.

EXAMPLE 20

The lens obtained in Example 10 was dipped in Primer composition (b), and pulled out at a speed of 15 cm/minute, thereby coating the lens with the composition. The lens was then heated at 90° C. for 0.5 hours to form a primer layer. Coating composition (a) shown in Table 5 was further coated onto this primer layer, and the same antireflection film as in Example 11 was provided thereon to obtain a lens of Example 20.

The adhesion to the hard coat layer and the photochromic color change properties of the lens were evaluated by the same methods as in Example 11. The results were as shown in Table 6.

TABLE 1

| Example | Polymerizable Monomers (wt %) | | | | | |
|---|---|---|---|---|---|---|
| | Monomer of Formula (I) | Other Monomers | | | | |
| | | (2) | (3) | (4) | (5) | (6) |
| 1 | METX 45 | PHEMA 25 | — | MMA 12 | IBM 12 | 4EGM 6 |
| 2 | METX 33 | BZMA 32 | — | MMA 12 | DCPM 15 | 4EGM 8 |
| 3 | METX 70 | — | — | EMA 12 | DCPM 12 | 4PGM 6 |
| 4 | MPTX 38 | BBPE 22 | — | EMA 20 | IBM 12 | 4EGM 8 |
| 5 | METX 30 | PHMA 22 | — | MMA 30 | IBM 10 | 4EGM 8 |
| 6 | METX 38 | PHEMA 22 | — | MMA 10 | IBM 20 | 4EGM 5 |
| 7 | MPTX 30 | BZMA 20 | BPE 10 | MMA 20 | DCPM 15 | 4EGM 5 |
| 8 | METX 30 | BZMA 20 | BBPE 20 | MMA 12 | IBM 12 | 4EGM 5 |
| 9 | METX 45 | PHEMA 25 | — | MMA 12 | IBM 12 | 4EGM 6 |
| 10 | METX 33 | BZMA 32 | — | MMA 12 | DCPM 15 | 4EG 8 |

TABLE 2

| Comparative Example | Polymerizable Monomers (wt %) | | | | | |
|---|---|---|---|---|---|---|
| | Monomer of Formula (I) | Other Monomers | | | | |
| | | (2) | (3) | (4) | (5) | (6) |
| 2 | — | — | BBPE 70 | EMA 12 | DCPM 12 | 4EGM 6 |
| 3 | — | BZMA 32 | BPE 28 | EMA 30 | — | 4PGM 10 |
| 4 | — | — | — | NMA 60 | — | 4EGM 40 |
| 5 | — | — | — | MMA 40 | IBM 30 | 4EGM 30 |

TABLE 3

| Example | Refraction Index | Saturated Vapor Absorption (%) | Heat Resistance (Tg) | Falling Ball Test (g) | Modulus of Elasticity (N · mm$^{-2}$) | Shape of Lens |
|---|---|---|---|---|---|---|
| 1 | 1.562 | 1.3 | 113 | 26 | $2.7 \times 10^3$ | A |
| 2 | 1.560 | 1.0 | 120 | 26 | $3.0 \times 10^3$ | A |
| 3 | 1.551 | 1.3 | 102 | 26 | $2.5 \times 10^3$ | B |
| 4 | 1.574 | 1.0 | 98 | 32 | $2.3 \times 10^3$ | A |
| 5 | 1.552 | 1.5 | 122 | 26 | $3.1 \times 10^3$ | A |
| 6 | 1.571 | 0.9 | 100 | 30 | $2.8 \times 10^3$ | A |
| 7 | 1.565 | 1.0 | 95 | 29 | $2.6 \times 10^3$ | A |
| 8 | 1.556 | 1.2 | 110 | 27 | $2.9 \times 10^3$ | A |
| 9 | 1.562 | 1.3 | 113 | 26 | $2.7 \times 10^3$ | A |
| 10 | 1.560 | 1.0 | 120 | 26 | $3.0 \times 10^3$ | A |

TABLE 4

| Comparative Example | Refraction Index | Saturated Vapor Absorption (%) | Heat Resistance (Tg) | Falling Ball Test (g) | Modulus of Elasticity (N · mm$^{-2}$) | Shape of Lens |
|---|---|---|---|---|---|---|
| 1 | 1.499 | 2.2 | 80  | 34 | 1.7 × 10$^3$ | A |
| 2 | 1.562 | 1.0 | 120 | 26 | 3.2 × 10$^3$ | A |
| 3 | 1.563 | 1.1 | 105 | 26 | 2.5 × 10$^3$ | B |
| 4 | 1.503 | 2.4 | 87  | 31 | 3.0 × 10$^3$ | A |
| 5 | 1.507 | 1.6 | 95  | 29 | 3.1 × 10$^3$ | A |

TABLE 5

| Coating Composition (Hard Coat) | Parts by weight | | | | | | | | | |
|---|---|---|---|---|---|---|---|---|---|---|
| b | GTS  | 15 | TMS | 7  | Ti/Ce | 28 | MeOH | 30 | IPA | 20 |
| c | GTS  | 20 | Sn/W | 20 | DOX   | 30 | MeOH | 30 | | |
| d | GMDS | 15 | CS  | 30 | GDPE  | 10 | MeCe | 45 | | |

TABLE 6

| Example | Primer | Hard Coat | Anti-relection Film | Hard Coat Adhesion (Score) | Photochromic Properties (A$_T$–A$_0$) | | | Durability in Photochromic Properties (T$_{1/2}$/h) | | |
|---|---|---|---|---|---|---|---|---|---|---|
| | | | | | 440 nm | 580 nm | 595 nm | 440 nm | 585 nm | 595 nm |
| 11 | — | a | a | 10 | 0.64 | 0.66 | —    | 203 | 198 | —   |
| 12 | — | a | a | 10 | 0.62 | —    | 0.51 | 195 | —   | 193 |
| 13 | — | a | b | 10 | 0.67 | 0.68 | —    | 209 | 206 | —   |
| 14 | — | a | b | 8  | 0.63 | 0.64 | —    | 196 | 195 | —   |
| 15 | — | b | b | 10 | 0.64 | 0.65 | —    | 201 | 197 | —   |
| 16 | — | c | b | 10 | 0.68 | 0.70 | —    | 200 | 198 | —   |
| 17 | — | d | a | 9  | 0.60 | 0.64 | —    | 192 | 190 | —   |
| 18 | — | b | a | 8  | 0.62 | 0.63 | —    | 195 | 188 | —   |
| 19 | a | a | a | 10 | 0.63 | 0.66 | —    | 201 | 196 | —   |
| 20 | b | a | a | 10 | 0.62 | —    | 0.53 | 194 | —   | 197 |
| Comparative Example 6  | — | a | a | 10 | 0    | 0    | — | —   | —   | — |
| Comparative Example 7  | — | a | a | 1  | 0.52 | 0.53 | — | 98  | 93  | — |
| Comparative Example 8  | — | a | b | 6  | 0.60 | 0.62 | — | 168 | 166 | — |
| Comparative Example 9  | — | a | a | 3  | 0.62 | 0.63 | — | 172 | 167 | — |
| Comparative Example 10 | — | a | a | 2  | 0.59 | 0.61 | — | 165 | 162 | — |

In the table,
 GTS: gamma-glycidoxypropyltrimethoxysilane
 GMDS: amma-glycidoxypropylmethyldiethoxysilane
 TMS: tetramethoxysilane
 Sn/W: a sol (dispersed in methanol, solid matter: 20%) obtained by coating a lead oxide sol with a composite sol of lead oxide and tungsten oxide
 CS: colloidal silica (dispersed in methanol, solid matter: 30%)
 Ti/Ce: a composite sol of titanium oxide and cerium oxide (dispersed in methanol, solid matter: 20%)
 DOX: 1,4-dioxane
 GDPE: glycerol dipolyglycidyl ether
 MeOH: methanol
 MeCe: methyl cellosolve
 IPA: isopropanol

What is claimed is:

1. A photochromic composition which is capable of being photochromic resin when polymerized, comprising:
   (a) a di(meth)acrylate compound represented by the formula (I):

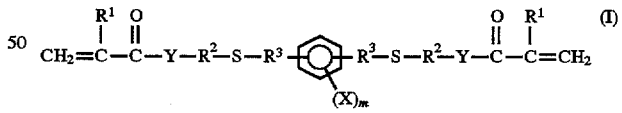

wherein
   two R$_1$s each independently represent hydrogen or methyl,
   two R$_2$s and two R$_3$s each independently represent alkylene having 1 to 4 carbon atoms,
   X represents halogen other than fluorine,
   two Ys each independently represent oxygen or sulfur, and
   m is an integer of 0 to 4; and
   (b) a photochromic compound in such an amount that photochromic properties can be imparted to the photochromic resin.

2. The photochromic composition according to claim 1, comprising 100 parts by weight of the di(meth)acrylate and 0.01 to 5 parts by weight of the photochromic compound.

3. The photochromic composition according to claim 1, wherein the di(meth)acrylate represented by the formula (I) is one or more selected from the group consisting of the following compounds:

p-bis(2-methacryloyloxyethylthio)xylylene,
p-bis(3-methacryloyloxypropylthio)xylylene,
p-bis(2-methacryloyloxyethylthioethyl)phenylene, and
p-bis(3-methacryloyloxypropylthioethyl)phenylene.

4. The photochromic composition according to claim 1, wherein the photochromic compound is one or more selected from spirooxazine compounds, fulgide compounds, fulgimide compounds and chromene compounds.

5. The photochromic composition according to claim 4, wherein the spirooxazine compound is represented by the formula (VII):

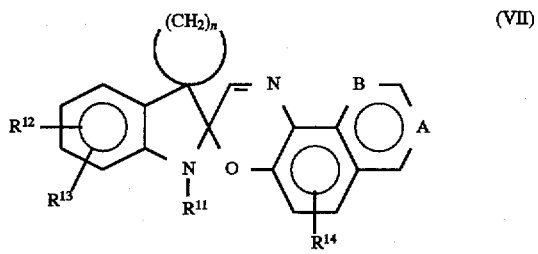

wherein either one of A and B represents N, and the other one represents CH, n is an integer of 4 to 6, $R^{11}$ represents hydrocarbon or alkoxycarbonylalkyl, $R^{12}$ and $R^{13}$ each independently represent hydrogen, halogen, hydrocarbon, alkoxyl, nitro, cyano, halogenoalkyl or alkoxycarbonyl, and $R^{14}$ represents hydrogen, halogen, hydrocarbon or alkoxyl;

the fulgide or fulgimide compound is represented by the formula (VIII):

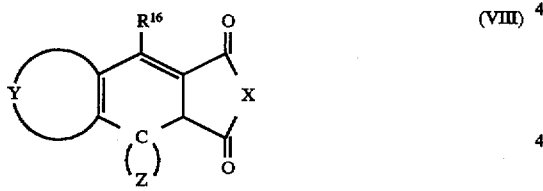

wherein the ring formed with Y represents an aromatic hydrocarbon group which may have a substituent, or an unsaturated heterocyclic group which may have a substituent, $R^{16}$ represents alkyl, aryl or heterocyclic, the ring formed with Z represents norbornylidene or adamantylidene, and X represents oxygen, or a group >N—$R^{17}$, >N—$A^1$—$B^1$—$(A^2)^m$—$(B^2)^n$—$R^{18}$, >N—$A^3$—$A^4$, —$A^3$—$R^{19}$ or >N—R, in which $R^{17}$ represents hydrogen, alkyl or aryl, $A^1$, $A^2$ and $A^3$ each independently represent alkylene, alkylidene, cycloalkylene or alkylcycloalkanediyl, $B^1$ and $B^2$ each independently represent —O—, —C(=O)—, —OC(=O)—, —OC(=O)O—, —C(=O)NH— or —NHC(=O)—, m and n each independently represent 0 or 1, provided that when m is 0, n is also 0, $R^{18}$ represents alkyl, naphthyl or naphthylalkyl, $A^4$ represents naphthyl, $R^{19}$ represents halogen, cyano or nitro, and R represents cyanoalkyl, nitroalkyl or alkoxycarbonylalkyl; and the chromene compound is represented by the formula (IX):

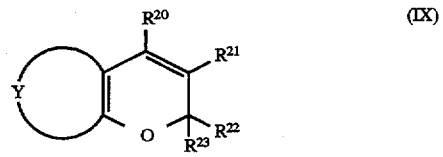

wherein $R^{20}$, $R^{21}$, $R^{22}$ and $R^{23}$ each independently represent hydrogen, alkyl, aryl, a substituted amino group or a saturated heterocyclic group, or $R^{22}$ and $R^{23}$ may form a ring selected from the group consisting of norbornylidene and bicyclo (3,3,1) 19-nonylidene, and the ring formed with Y represents an aromatic ring or an unsaturated heterocyclic ring, in which one or more hydrogen atoms may be substituted by alkyl having 1 to 20 carbon atoms or alkoxyl having 1 to 20 carbon atoms.

6. the photochromic composition according to claim 1 further comprising a monomer which when polymerized forms a homopolymer having a refraction index of 1.55 or more.

7. The photochromic composition according to claim 6, wherein the monomer which when polymerized forms a homopolymer having a refraction index of 1.55 or more is a mono(meth)acrylate compound represented by the formula (II):

wherein $R^1$ is as defined in the formula (I), and $R^4$ represents phenyl, benzyl or 2-phenoxyethyl, or phenyl, benzyl or 2-phenoxyethyl in which hydrogen atoms are partly substituted by halogen other than fluorine; or di(meth)acrylate represented by the formula (III):

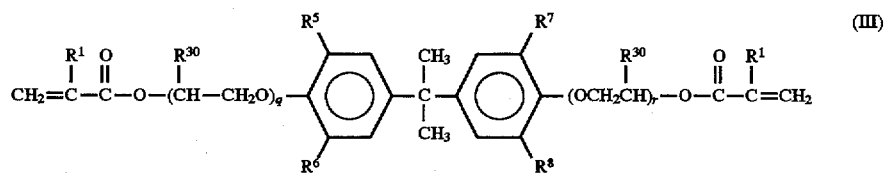

wherein $R^1$s are as defined in the formula (I), two $R^{30}$s each independently represent hydrogen or methyl, $R^5$, $R^6$, $R^7$ and $R^8$ each independently represent hydrogen or halogen other than fluorine, and q and r are such integers that the total of q and r is from 0 to 10.

8. The photochromic composition according to claim 7, wherein the mono(meth)acrylate compound represented by the formula (II) is selected from phenyl (meth)acrylate, benzyl (meth)acrylate, 2-phenoxyethyl (meth)acrylate, 1,3,5-tribromophenyl (meth)acrylate and 2-(1', 3', 5'-tribromophenyl)-oxyethyl (meth)acrylate.

9. The photochromic composition according to claim 7, wherein the di(meth)acrylate compound represented by the formula (III) is 2,2'-bis[4-(methacryloyloxyethoxy)-phenyl]propane or 2,2'-bis[(3,5-dibromo-4-methacryloyloxyethoxy)phenyl]propane.

10. The photochromic composition according to claim 1, further comprising a monomer which when polymerized forms a homopolymer having a refraction index of less than 1.55.

11. The photochromic composition according to claim 10, wherein the monomer which when polymerized forms a homopolymer having a refraction index of less than 1.55 is a mono(meth)acrylate compound represented by the formula (IV) or (V):

(IV)

wherein $R^1$ is as defined in the formula (I), and $R^9$ represents alkyl having 1 to 4 carbon atoms, or

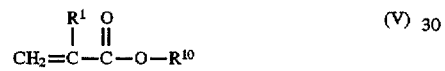
(V)

wherein $R^1$ is as defined in the formula (I), and $R^{10}$ represents an alicyclic hydrocarbon group having 5 to 16 carbon atoms; or a di(meth)acrylate compound represented by the formula (VI):

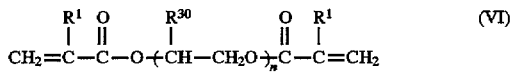
(VI)

wherein $R^1$s are as defined in the formula (I), $R^{30}$, represents hydrogen or methyl and n is an integer of 1 to 10.

12. A photochromic resin comprising a polymer of the photochromic composition according to claim 1.

13. A photochromic lens comprising the photochromic resin according to claim 12.

14. The photochromic lens according to claim 13, comprising a hard coat layer on the surface thereof.

15. A photochromic resin comprising a polymer of the photochromic composition of claim 2.

16. A photochromic resin comprising a polymer of the photochromic composition of claim 3.

17. A photochromic resin comprises a polymer of the photochromic composition of claim 4.

18. A photochromic resin comprising a polymer of the photochromic composition of claim 6.

19. A photochromic resin comprising a polymer of a photochromic composition of claim 10.

20. A photochromic lens comprising the photochromic resin according to claim 18.

* * * * *